(No Model.) 3 Sheets—Sheet 1.

C. S. COLE & J. H. KINSMAN.
PENCIL SHARPENER.

No. 598,770. Patented Feb. 8, 1898.

WITNESSES
R. H. Newman.
Harriet L. Dason.

INVENTORS
CHARLES S. COLE, and
JOHN H. KINSMAN.
BY
Chamberlain & Newman
ATTORNEYS (No Model.) 3 Sheets—Sheet 2.

C. S. COLE & J. H. KINSMAN.
PENCIL SHARPENER.

No. 598,770. Patented Feb. 8, 1898.

WITNESSES
R. H. Newman.
Harriet L. Slason.

INVENTORS
CHARLES S. COLE, and
JOHN H. KINSMAN
BY
Chamberlain & Newman
ATTORNEY (No Model.) 3 Sheets—Sheet 3.

C. S. COLE & J. H. KINSMAN.
PENCIL SHARPENER.

No. 598,770. Patented Feb. 8, 1898.

WITNESSES
R. H. Newman.
Harriet L. Sloan.

INVENTORS
CHARLES S. COLE, and
JOHN H. KINSMAN
BY Chamberlain & Newman
ATTORNEYS

THE NORRIS PETERS CO., PHOTO-LITHO., WASHINGTON, D. C.

UNITED STATES PATENT OFFICE.

CHARLES S. COLE AND JOHN H. KINSMAN, OF BRIDGEPORT, CONNECTICUT.

PENCIL-SHARPENER.

SPECIFICATION forming part of Letters Patent No. 598,770, dated February 8, 1898.

Application filed March 17, 1897. Serial No. 628,058. (No model.)

*To all whom it may concern:*

Be it known that we, CHARLES S. COLE and JOHN H. KINSMAN, citizens of the United States, and residents of Bridgeport, in the county of Fairfield and State of Connecticut, have invented certain new and useful Improvements in Pencil-Sharpeners, of which the following is a specification.

This invention relates to new and useful improvements in pencil-sharpeners such as are used in schools, offices, and the like to quickly and perfectly sharpen pencils to a desirable round point.

It is the object of our invention to improve upon machines of the above class in the following important particulars: first, to simplify and cheapen the cost of production; second, to produce a machine which can be made to operate upon several pencils at once, and, further, to use a file for said purpose which is held to its work by means of gravity and performs its cutting operation while moving in both directions.

With the above objects in view we have devised the simple and novel construction shown upon the accompanying drawings, forming a part of this specification, and upon which similar characters of reference denote like or corresponding parts upon the several figures, and of which—

Figure 1:
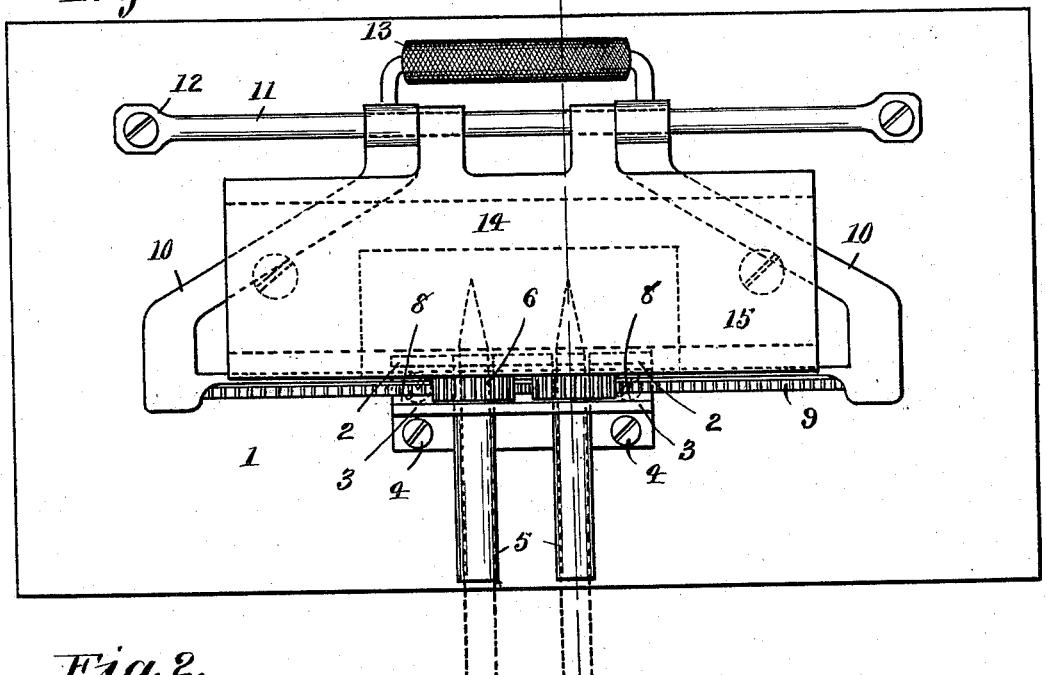
Figure 2:
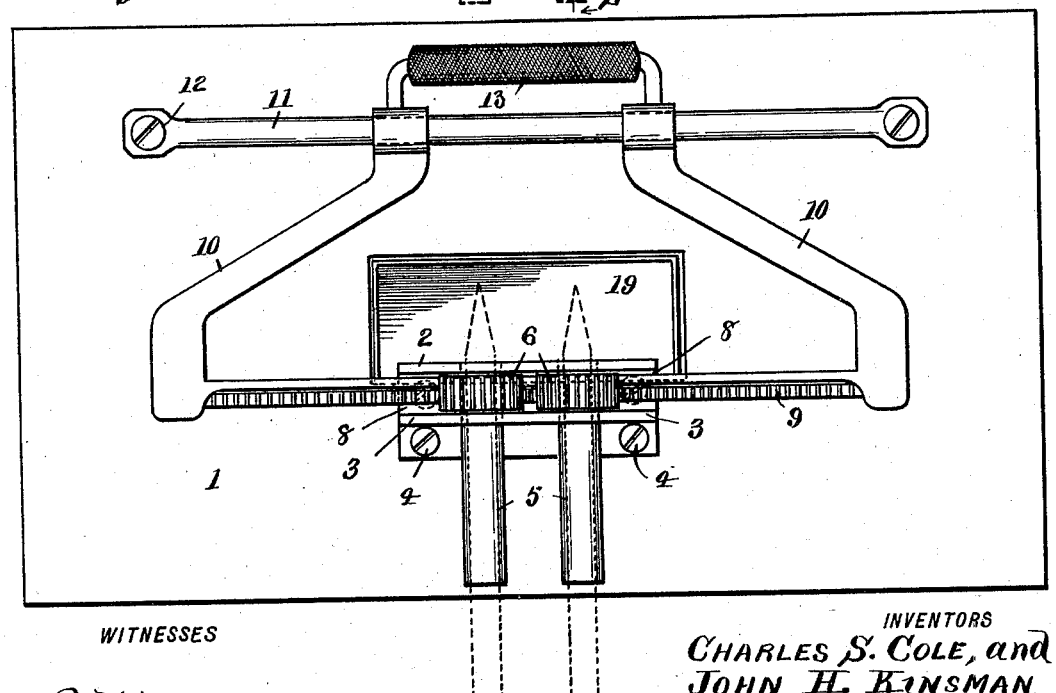
Figure 3:
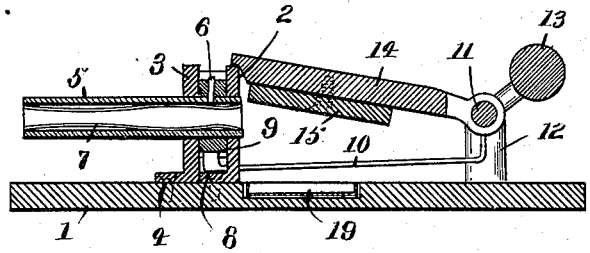
Figure 4:
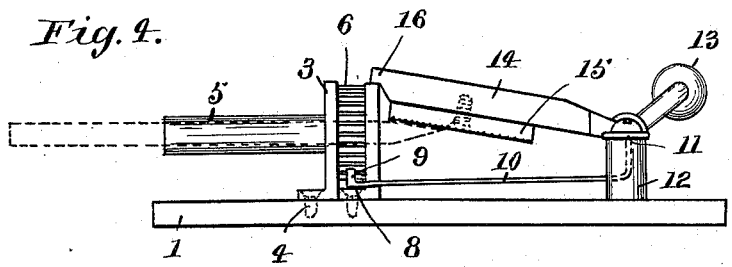
Figure 5:
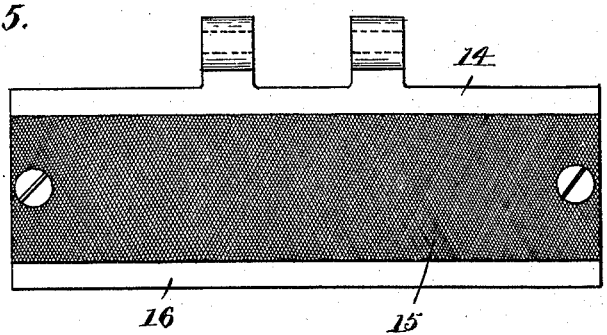
Figure 6:
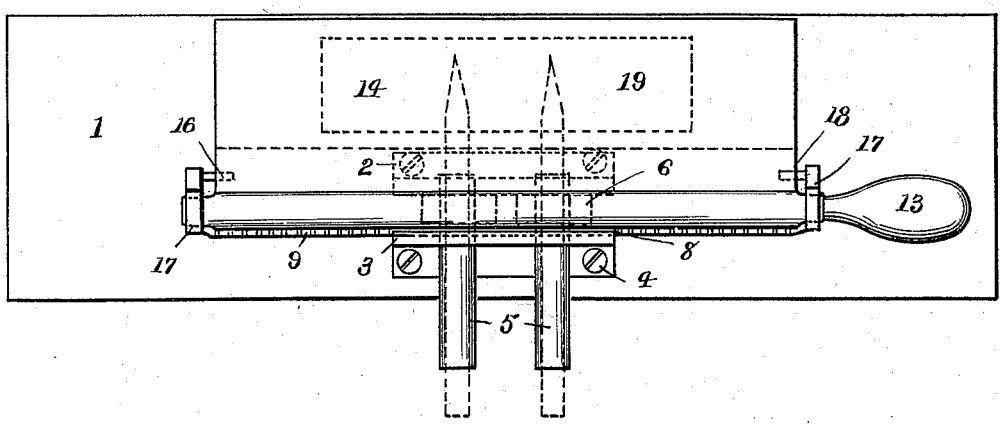
Figure 7:
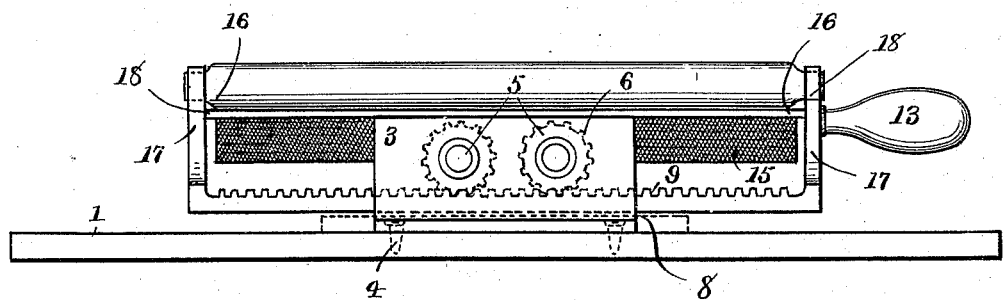
Figure 8:
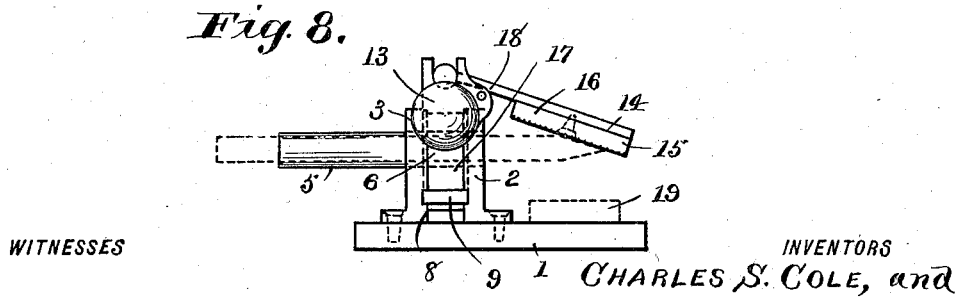

Figure 1 shows a plan view of our novel machine complete. Fig. 2 is a similar plan view, but having the file-plate removed. Fig. 3 is a central vertical cross-section on line $x$ $x$ of Fig. 1. Fig. 4 is an end view of Fig. 1. Fig. 5 is an inverted detached plan view of the file and its plate. Figs. 6, 7, and 8 show a plan, a side, and end view, respectively, of a modified form of construction.

Referring to the characters of reference marked upon the drawings, 1 indicates the base, which is preferably formed of wood and of any convenient size and design.

2 and 3 represent suitable brackets which are secured to the bed by means of screws 4 and serve to support the revoluble pencil-holders, which we designate by 5. It will further be apparent that brackets 2 and 3 are set at a given distance apart in a manner to admit of the introduction of the small pinions 6 6, arranged upon the pencil-holders 5, journaled in the brackets before mentioned. Said pinions may be secured to said holders in any suitable manner—for instance, by means of a pin, as shown in Fig. 3. The holders 5 are provided upon the inside with a suitable clamp 7, in which the pencil is forced and held while being operated thereon.

Between the brackets 2 and 3 and below the pinion 6 is formed a suitable way 8, upon which a slide-rack 9 is designed to reciprocate. The teeth of said rack mesh with those of the pinions and serve to alternately rotate said pinions in each direction by the reciprocating movement of said rack. The rack 9 is provided with arms 10 10, which are slidably fitted to a guide-rod 11, which latter is mounted upon posts 12, secured to the bed, as shown in Figs. 3 and 4. To the arms 10 10 of the rack is secured an operating-handle 13, by means of which the rack-carriage is reciprocated to and fro.

Between the arms 10 and upon the guide-rod is hinged a slide-plate 14, which in practice is made quite heavy. Said plate is provided upon its under side with a suitable file 15, which serves to operate upon the pencils when inserted in the holders before mentioned. It will be obvious that the plate in question, together with its file, will be moved backward and forward with the movement of the handle and its rack-carriage, and that by reason of such operation the file will operate upon the pencil and quickly cut it down to a desirable point, at which instant the surface 16 of the plate will come in contact with the top edge of the bracket 2 in a manner to prevent any further descent of said file and its plate. By this means the perfect operation is insured and the pencil when once sharpened is prevented from any further cutting by the file, thus leaving the tip perfect.

It will be apparent from the foregoing that the pressure of the file upon the pencil is secured by gravity, and that a desired amount of said pressure is secured by the weight of the plate and file upon the pencil. This feature we consider important for a quick and smooth sharpening operation.

In Figs. 6, 7, and 8 it will be seen that we have shown a modified construction which is particularly adapted for a single pencil, and, as is apparent, is very much simplified in that we avoid the use of the guide-rod 11 and pivot the file-plate directly to uprights 17 of the slide. It will further be apparent in this connection that the file-plate swings outward instead of inward, as in the other form, but the operation thereof is substantially the same in every particular, said plate being limited in its downward movement by the adjustable stop-pins 18, secured to the uprights 17, before mentioned, which construction acts identically the same as in the other form.

A receptacle 19 is provided beneath the file to catch the filings from the pencil, which receptacle is adapted to be removed and emptied from time to time, as occasion may require. Said receptacle may be of any suitable material and construction, but preferably substantially as shown in the drawings.

By reason of our special construction it will be seen that the rotary movements of the pencils and their holders are in the opposite direction from the travel of the file, and consequently the friction or cutting operation of the latter is materially increased. It will further be apparent from the construction that the file operates in both its forward and backward movement. As a result of the foregoing facts a pencil can be sharpened in less than one-half the time consumed by a machine cutting in but one direction and in which the rotation of the pencil is with the movement of the file.

It will be observed that we have shown two pencil-holders in the drawings which are exact duplicates of each other and, as stated, operate simultaneously. This number, however, is not essential, as a greater or less number can be used to advantage. We therefore do not limit ourselves to the number shown.

It will further be obvious that sandpaper, emery, or similar material may be used as a substitute for the file.

Having thus described our invention, what we consider new, and desire to secure by Letters Patent, is—

1. In a pencil-sharpener of the class described the combination with the base provided with a suitable way 8, of a slide-rack 9 mounted therein, uprights secured to said rack, a gravity-file pivoted to said uprights, means for limiting the downward movement of said file with regard to the uprights, a pencil-holder rotatably mounted adjacent to said file and bearing a pinion to mesh with the rack of the slide aforesaid.

2. In a pencil-sharpener of the class described, the combination with the base provided with brackets 2 and 3, way 8 between said brackets, a slide-rack operatively mounted in said way, uprights secured to said rack, a gravity-file pivoted to said uprights, a pin for limiting the downward movement of said file, a pencil-holder operatively mounted adjacent to said file and bearing means for centering a pencil therein, a pinion upon said holder meshing with the rack aforesaid whereby the pencil is manipulated by said rack.

Signed at Bridgeport, in the county of Fairfield and State of Connecticut, this 5th day of March, A. D. 1897.

CHARLES S. COLE.
JOHN H. KINSMAN.

Witnesses:
C. M. NEWMAN,
HARRIET L. SLASON.